US006198758B1

(12) United States Patent
Broderick et al.

(10) Patent No.: US 6,198,758 B1
(45) Date of Patent: Mar. 6, 2001

(54) LASER WITH HEAT TRANSFER SYSTEM AND METHOD

(75) Inventors: Jeffery A. Broderick; Benjamin K. Jones; Jason W. Bethel, all of Seattle; Eugene F. Yelden, Mill Creek, all of WA (US)

(73) Assignee: Synrad, Inc., Mukilteo, WA (US)

( * ) Notice: Subject to any disclaimer, the term of this patent is extended or adjusted under 35 U.S.C. 154(b) by 0 days.

(21) Appl. No.: 09/472,726

(22) Filed: Dec. 27, 1999

(51) Int. Cl.$^7$ ........................................................ H01S 3/04
(52) U.S. Cl. .................. 372/36; 372/34; 372/87; 372/92; 372/64
(58) Field of Search ................... 372/36, 34, 87, 372/92, 64

(56) References Cited

U.S. PATENT DOCUMENTS

| | | |
|---|---|---|
| 4,129,836 | 12/1978 | Papayoanou ................ 331/94.5 D |
| 4,433,418 * | 2/1984 | Smith ................................ 372/95 |
| 4,446,558 | 5/1984 | Sepp et al. ........................ 372/64 |
| 4,481,634 | 11/1984 | Grossman et al. ................ 372/87 |
| 4,500,996 | 2/1985 | Sasnett et al. .................... 372/19 |
| 4,577,323 | 3/1986 | Newman et al. .................. 372/64 |
| 4,618,961 | 10/1986 | Sutter, Jr. ......................... 372/87 |
| 4,719,639 | 1/1988 | Tulip ................................. 372/66 |
| 4,759,027 | 7/1988 | Hahn et al. ....................... 372/61 |
| 4,805,182 | 2/1989 | Laakmann ........................ 372/82 |
| 4,837,772 | 6/1989 | Laakmann ........................ 372/82 |
| 4,841,539 | 6/1989 | Hahn et al. ....................... 372/63 |
| 4,939,738 | 7/1990 | Opower ............................ 372/95 |
| 5,008,894 | 4/1991 | Laakmann ........................ 372/38 |
| 5,048,048 | 9/1991 | Nishimae et al. ................ 372/95 |
| 5,065,405 | 11/1991 | Laakmann et al. .............. 372/92 |
| 5,123,028 | 6/1992 | Hobart et al. .................... 372/95 |
| 5,125,001 * | 6/1992 | Yagi et al. ........................ 372/92 |
| 5,131,003 | 7/1992 | Mefferd ............................ 372/65 |
| 5,140,606 | 8/1992 | Yarborough et al. ............ 372/64 |
| 5,164,952 | 11/1992 | Guenther ........................... 372/61 |

(List continued on next page.)

OTHER PUBLICATIONS

Hall, D.R. and Hill, C.A., *Handbook of Molecular Lasers*, Marcel Dekker, Inc., New York, NY, 1987, Chap. 3, "Radiofrequency–Discharge–Excited $CO_2$ Lasers," pp. 165–258.

Hodgson, N. and Weber, H., *Optical Resonators: Fundamentals, Advanced Concepts and Applications*, Springer–Verlag, London, 1997, Chap. 2, pp. 54–114.

Hodgson, N. and Weber, H., *Optical Resonators: Fundamentals, Advanced Concepts and Applications*, Springer–Verlag, London, 1997, Chap. 5, pp. 165–222.

Oron, R. et al., "Laser Mode Discrimination with Intracavity Spiral Phase Elements," *Opt. Comm.*, 169:115–121, 1999.

Witteman, W.J., *The $CO_2$ Laser*, Springer Series in Optical Sciences; v. 53, Springer–Verlag Berlin Heidelberg, 1987, pp. 170–178.

*Primary Examiner*—Leon Scott, Jr.
(74) *Attorney, Agent, or Firm*—Seed IP Law Group PLLC

(57) ABSTRACT

A laser with a heat transfer system and method of making the same using electrodes. The heat transfer system draws heat from the electrodes which have internal electrode surfaces adjacent to a lasing medium of the laser. Cooling of the electrodes helps to maintain proper operating temperature for the lasing medium. The heat transfer system utilizes thermally conductive material positioned between external surfaces of the electrodes and internal surfaces of a housing that contains the electrodes and the lasing medium. Since the thermally conductive material adds capacitance to the laser system, inductance may be added for compensation depending upon the amount of thermally conductive material used. Options exist for positioning and applying the thermally conductive material between the electrodes and housing including press fitting strips of the thermally conductive material in depressions in the electrodes, and spray coating the thermally conductive material onto the electrodes, or the housing, or onto both the electrodes and the housing.

25 Claims, 11 Drawing Sheets

U.S. PATENT DOCUMENTS

| | | | |
|---|---|---|---|
| 5,197,079 | 3/1993 | Krueger et al. | 372/87 |
| 5,220,577 | 6/1993 | Opower | 372/92 |
| 5,231,644 | 7/1993 | Krueger et al. | 372/107 |
| 5,245,625 | 9/1993 | Guenther | 372/82 |
| 5,255,283 * | 10/1993 | Belanger et al. | 372/92 |
| 5,271,029 * | 12/1993 | Seiffarth et al. | 372/64 |
| 5,335,242 | 8/1994 | Hobart et al. | 372/95 |
| 5,353,297 | 10/1994 | Koop et al. | 372/64 |
| 5,392,309 * | 2/1995 | Nishimae et al. | 372/95 |
| 5,412,681 * | 5/1995 | Eisel et al. | 372/64 |
| 5,430,753 | 7/1995 | WelsCh et al. | 372/87 |
| 5,600,668 | 2/1997 | Erichsen et al. | 372/87 |
| 5,661,746 | 8/1997 | Sukhman et al. | 372/83 |
| 5,684,822 * | 11/1997 | Partlo | 372/95 |
| 5,748,663 | 5/1998 | Chenausky | 372/64 |
| 5,754,575 | 5/1998 | Sukhman et al. | 372/36 |
| 5,822,354 | 10/1998 | Vitruk | 372/92 |
| 5,881,087 | 3/1999 | Sukhman | 372/61 |
| 5,892,782 * | 4/1999 | Vitruk et al. | 372/64 |
| 5,894,493 | 4/1999 | Sukhman et al. | 372/83 |
| 5,953,360 | 9/1999 | Vitruk et al. | 372/87 |
| 5,982,803 | 11/1999 | Sukhman et al. | 372/87 |

* cited by examiner

LASER WITH HEAT TRANSFER SYSTEM AND METHOD

CROSS-REFERENCES TO RELATED APPLICATIONS

The present invention is related to commonly assigned, concurrently filed and co-pending U.S. application Ser. No. 09/472,731 for "LASER WITH SIMPLIFIED RESONATOR FOR PRODUCING HIGH QUALITY LASER BEAMS"; Ser. No. 09/472,733 for "LASER SYSTEM AND METHOD FOR BEAM ENHANCEMENT"; and Ser. No. 09/472,735 for "LASER ASSEMBLY SYSTEM AND METHOD." All of the above U.S. Applications are incorporated by reference.

TECHNICAL FIELD

The present invention relates generally to cooling systems for lasers, and more particularly, to a heat transfer system and method for lasers utilizing electrode based excitation.

BACKGROUND OF THE INVENTION

Many types of lasers use electrodes to convey excitation energy to either gaseous or non-gaseous plasmas. For instance, radio frequency excited gas lasers utilizing electrodes have become a mainstay in a wide variety of industrial, medical, and scientific applications. In particular, molecular gas lasers, such as those based on carbon dioxide gas, use electrodes to excite the gas plasma.

As is typical with gas lasers, gas temperature is a determining factor of equipment size, beam quality, and power levels of operation. For example, the maximum acceptable plasma temperature for a carbon dioxide based laser is approximately 600 Kelvin. Generally, for optimal performance of a laser, certain temperature ranges for operation of laser plasma are preferred. During operation, generation of the laser plasma produces much heat. To maintain optimal temperature ranges for the plasma any excess heat must be extracted from the plasma.

In lasers utilizing electrodes, the plasma generally contacts the surfaces of the electrodes. The electrodes, thus, become a possible candidate for removing heat from the plasma. Some conventional lasers utilize electrode surfaces in contact with the plasma for cooling by actively cooling the electrodes using fluid circulating through the electrodes. Circulating fluid through electrodes, however, complicates assembly and operation, and increases overall laser system package size.

Other conventional lasers have recognized the problems of circulating fluid through electrodes. Unfortunately, with these conventional lasers that do not cool the electrodes with fluid, the electrodes serve a rather limited role in removing heat from the plasmas. Consequently, these conventional lasers have limitations regarding operational power levels or have cooling structures apart from the electrodes. These additional cooling structures also increase laser size and expense, or restrict laser operations. For instance, some conventional lasers actively circulate the plasma gases, which increases laser size and cost. Other conventional lasers use structures that provide surfaces other than those of the electrodes for cooling of the plasmas.

These strictures include bores, rods, or discharge side walls, which complicate laser assembly, increase laser size, and limit laser operation. For instance, discharge sidewalls can restrict expansion of the gas plasma so that standing waves of varying gas density occur in the gas plasma. These standing waves introduce limitations for the operation of the laser such as the frequencies at which the laser can be pulsed.

SUMMARY OF THE INVENTION

A laser with heat transfer system and method has aspects including first and second electrodes, a lasing medium, a housing, and first and second portions of thermally conductive and electrically insulating material being other than the lasing medium. The first and second electrodes have an interior surface and an exterior surface. The lasing medium is located between at least portions of the interior surfaces of the first and second electrodes. The housing has opposing first and second walls with first and second interior surfaces, respectively, forming at least a portion of a housing cavity sized to contain the first and second electrodes. The first and second electrodes are positioned inside the housing cavity with the interior surfaces of the first and second electrodes opposingly spaced a part.

The first interior housing surface is spaced from the exterior surface of the first electrode by at least a first distance forming a first volume between the first interior housing surface and the exterior surface of the first electrode. The second interior housing surface is spaced from the exterior surface of the second electrode by at least a second distance forming a second volume between the second interior housing surface and the exterior surface of the second electrode.

The first and second portions of the thermally conductive and electrically insulating material is other than the lasing medium. The first portion of the thermally conductive material is positioned in contact with at least a portion of the first interior housing surface and at least 5% of the exterior surface of the first electrode and occupies a portion of the first volume. The second portion of the thermally conductive material is positioned in contact with at least a portion of the second interior housing surface and at least 5% of the exterior surface of the second electrode and occupies a portion of the second volume.

Further aspects include the thermally conductive material comprising a ceramic. Other aspects include the laser medium filling at least portions of the first and second volumes not occupied by the first and second portions of the thermally conductive materials. In some of these further aspects, the lasing medium is at a pressure less than atmospheric pressure to produce a pressure differential to provide an inwardly directed force on the first and second walls. The first and second walls have sufficient flexibility to flex inward under the inwardly directed force provided by the pressure differential to press the first and second interior surfaces against the first and second portions of the thermally conductive material, respectively.

Additional aspects include the first portion of the thermally conductive material comprising a first plurality of ceramic strips. The external surface of the first electrode being formed with a first plurality of depressions. Each depression of the first plurality of depressions is sized to receive at least one of the first plurality of ceramic strips therein. The second portion of the thermally conductive materials comprising a second plurality of ceramic strips. The external surface of the second electrode is formed with a second plurality of depressions. Each depression of the second plurality of depressions is sized to receive at least one of the second plurality of ceramic strips.

DETAILED DESCRIPTION OF THE INVENTION

Figure 1:
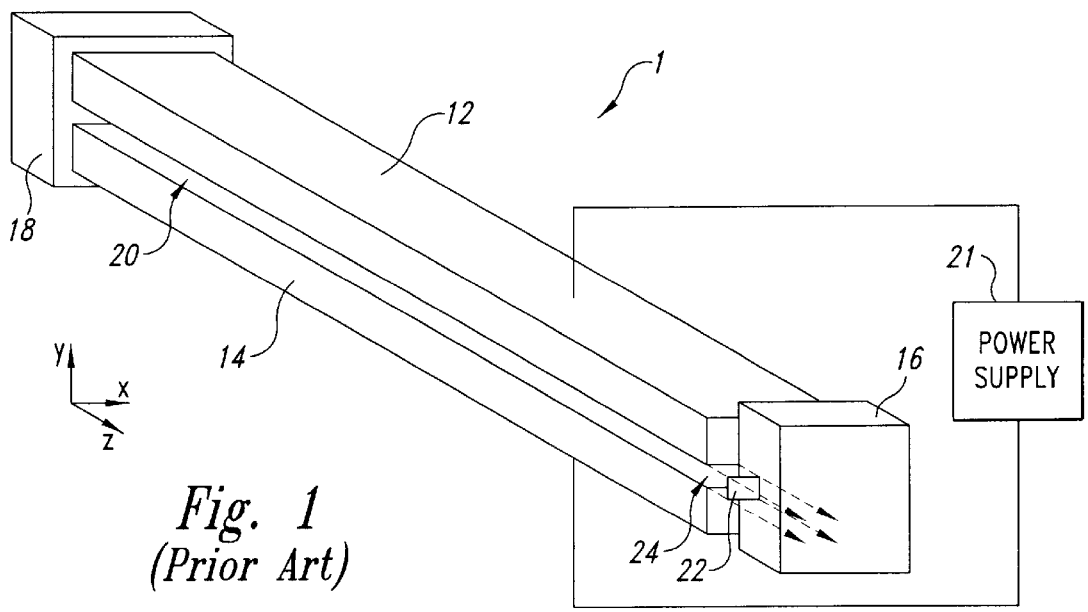
FIG. 1 is an isometric schematic drawing of a slab laser utilizing an embodiment of the present invention.

As shown in the drawings for purposes of illustration, the present invention is embodied in a narrow gap, or slab, gas laser with a cooling system, sharing some aspects in common with the conventional slab laser generally indicated by reference 1 in FIG. 1. The conventional slab laser 1 includes first and second elongated planar slab electrodes 12 and 14 parallel to each other and extending between a front resonator mirror 16 and a rear resonator mirror 18. A gas lasing medium is positioned within an optical resonator cavity 20 formed between the resonator mirrors 16 and 18. The resonator cavity 20 serves as a discharge area for the gas lasing medium.

Figure 2:
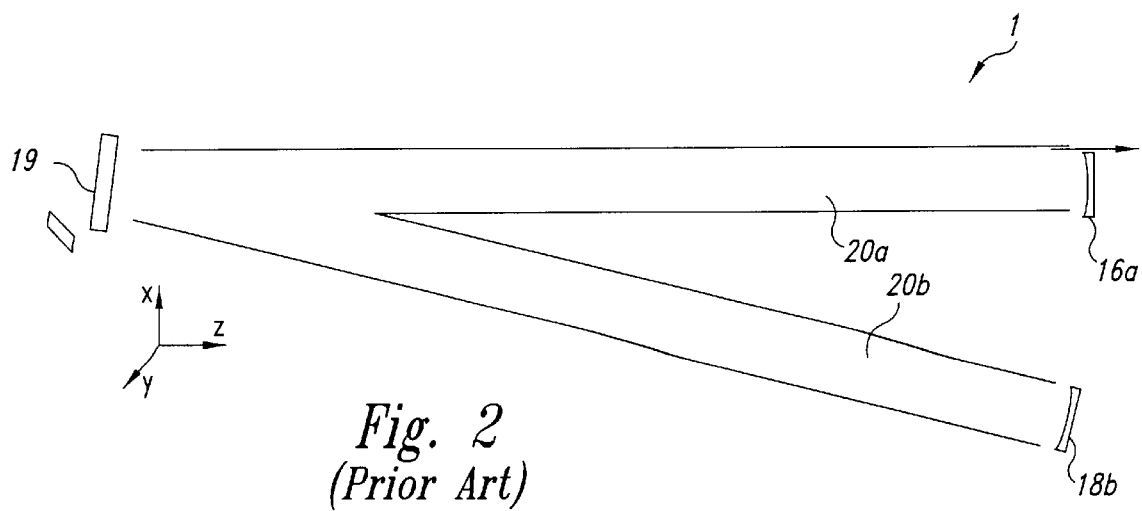
FIG. 2 is a schematic drawing of a slab laser utilizing a folded resonator embodiment of the present invention.
Figure 3:
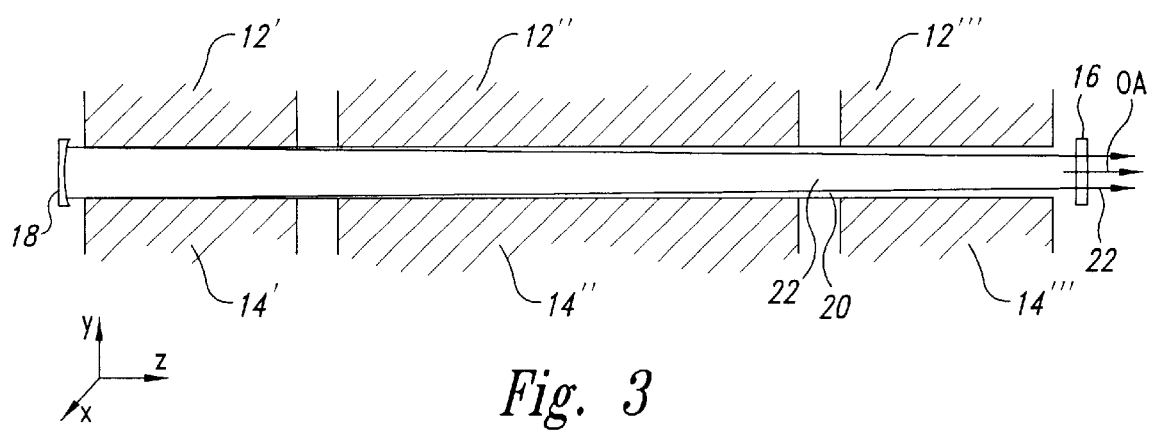
FIG. 3 is a longitudinal cross-sectional view of an alternative embodiment of the present invention illustrating use of multiple sets of electrode pairs.
Figure 4:
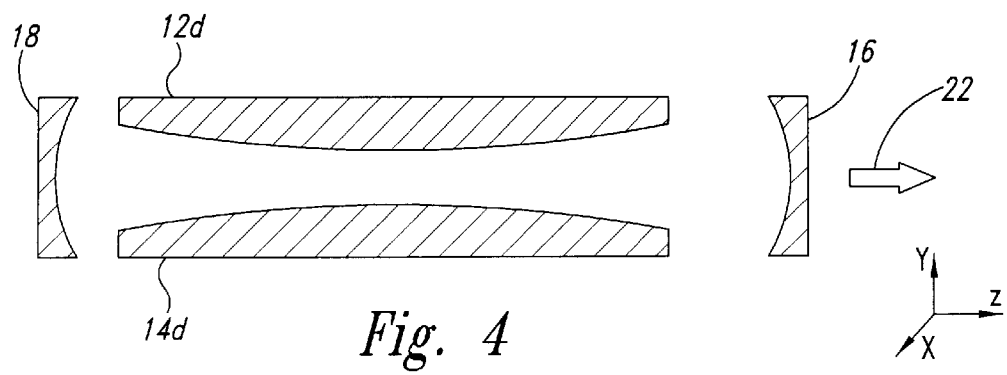
FIG. 4 is a longitudinal cross-sectional view of an alternative embodiment of the present invention illustrating use of contoured electrodes.
Figure 5:
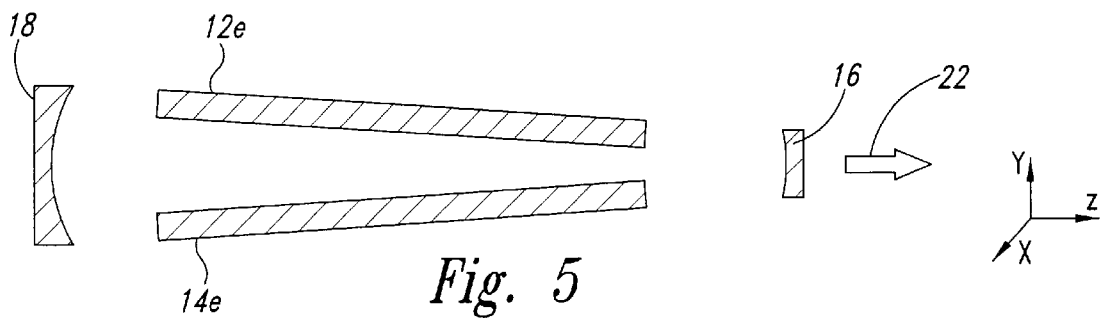
FIG. 5 is a longitudinal cross-sectional view of an alternative embodiment of the present invention illustrating use of tapered electrodes.
Figure 6:
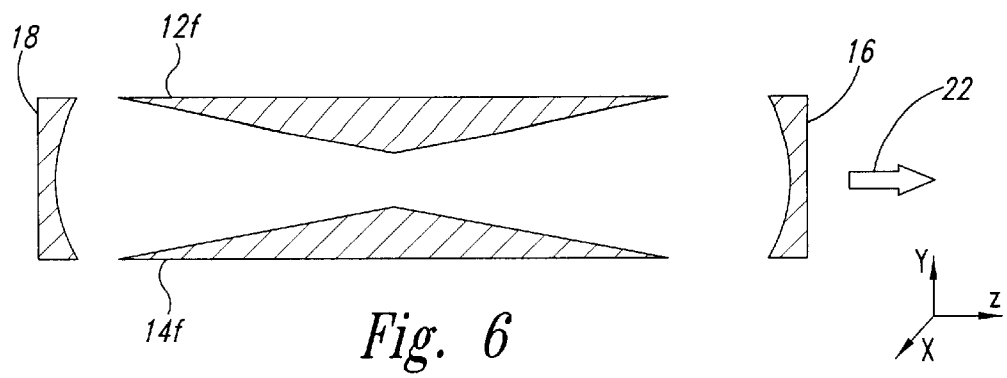
FIG. 6 is a longitudinal cross-sectional view of an alternative embodiment of the present invention illustrating use of triangularly tapered electrodes.
Figure 9:
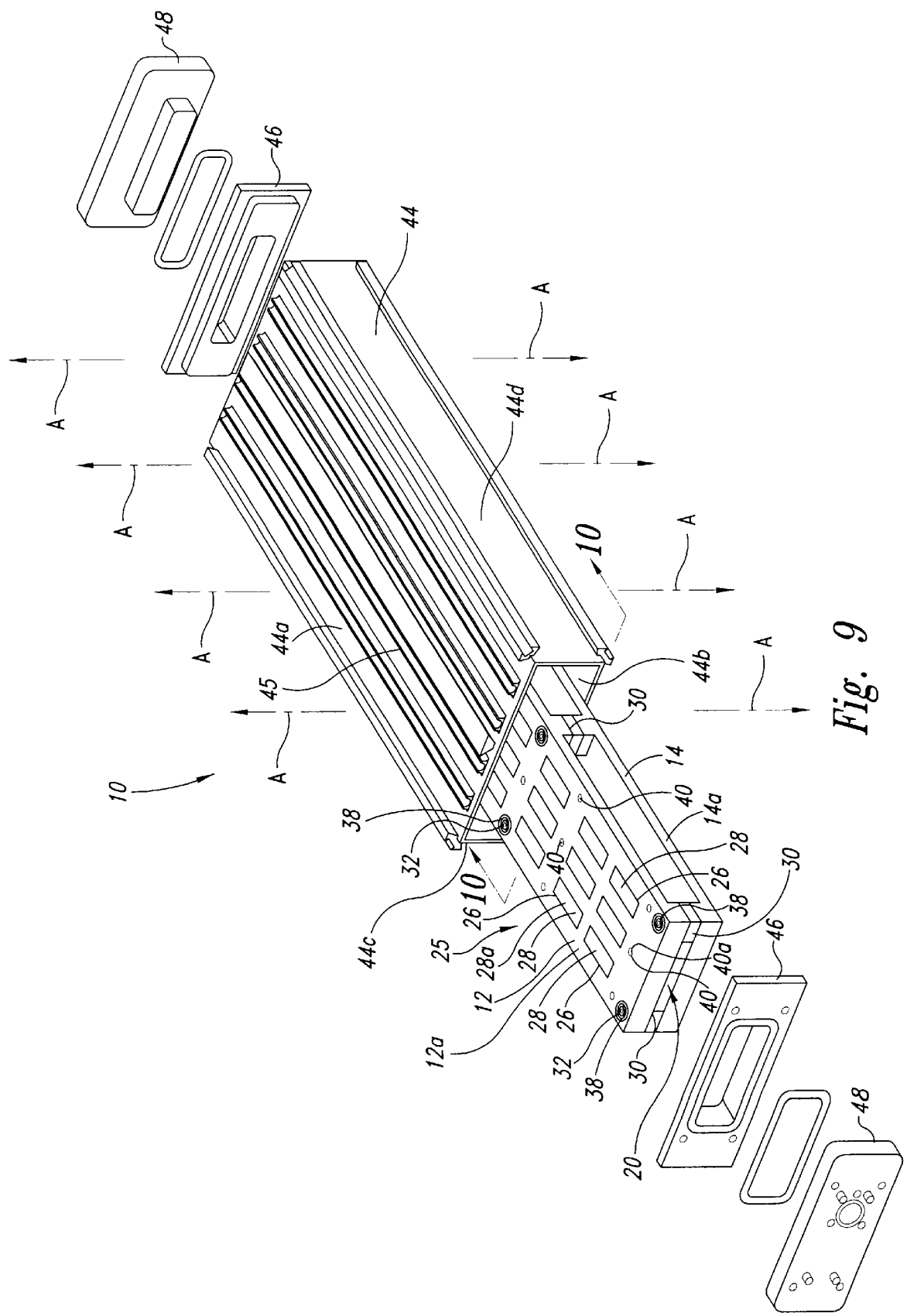
FIG. 9 is an exploded isometric diagram illustrating the assembly details of the depicted embodiment of the present invention.
Figure 10:
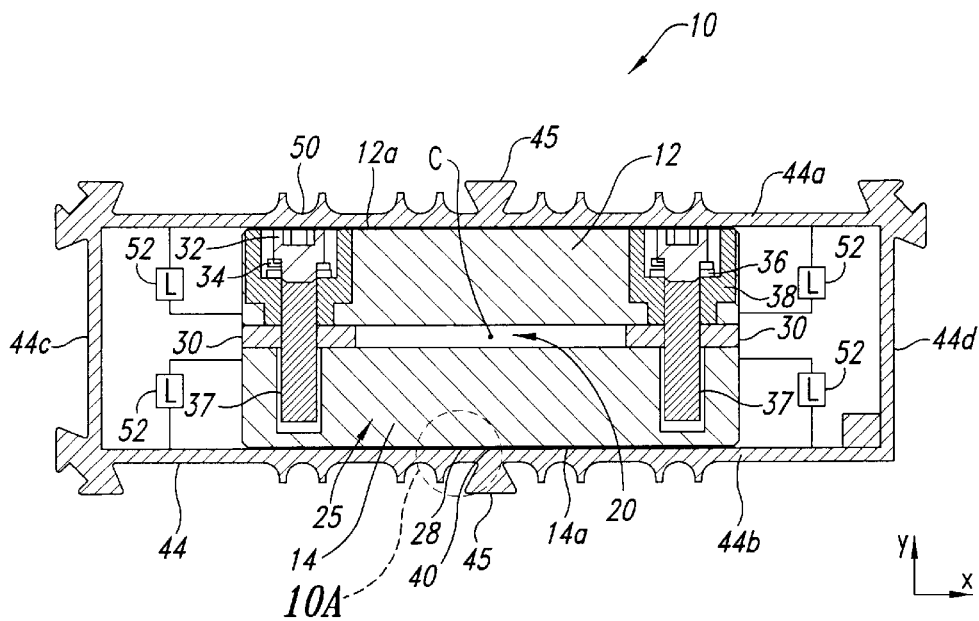
FIG. 10 is an enlarged transverse cross-sectional view of the assembled laser taken substantially along the line 10—10 of FIG. 9 with alternative inductors used.
Figure 10A:
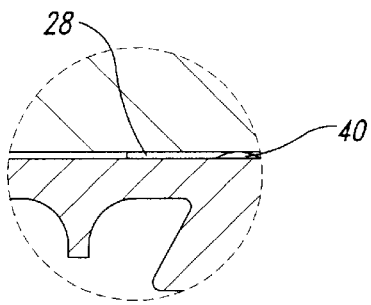
FIG. 10A is a detailed view of a portion of FIG. 10 including a thermal strip and a ceramic pill.

In the depicted embodiment, the resonator cavity is rectangularly shaped, however, alternative embodiments have square, annular, or other shaped resonator cavities, such as folded resonator cavities. A slab laser 10 according to the present invention (such as shown in FIGS. 9 and 10) can have a folded resonator in some embodiments that are similar in some aspects to the conventional folded resonator shown in FIG. 2, which in this case has a flat mirror 19 positioned between the front and rear mirrors 16a and 18b. Typical with folded cavities, there are multiple resonator sections 20a and 20b, as shown in FIG. 2. Some of the reference numbers in the detailed description are used for parts of both the conventional slab laser 1 and the slab laser according to the present invention 10. For instance, both the slab laser 1 and the slab laser 10 have first and second electrodes 12 and 14, however, as evident from the discussion below, the first and second electrodes 12 and 14 of the inventive slab laser 10 may not share all its aspects with conventional electrodes. Other embodiments have other configurations of mirrors and resonator cavities, including more than two resonator sections. For instance, some embodiments use more than one set of electrodes with more than one associated discharge space such as those sets of electrodes shown in FIG. 3 having pairs of first and second electrodes 12', 14', and 12", 14", and 12'", 14'", respectively. Other embodiments utilize contoured first and second electrodes 12d and 14d that are non-planar with respect to at least one dimension, for instance the longitudinal z-axis, as shown in FIG. 4. Further embodiments use tapered first and second electrodes that are planar, but are not parallel with the longitudinal z-axis such as tapered first and second electrodes 12e and 14e of FIG. 5 and triangularly tapered first and second electrodes 12f and 14f of FIG. 6. Other configurations for electrodes are used as well.

For the depicted embodiment, the gas lasing medium is a standard mixture of one part carbon dioxide ($CO_2$), one part nitrogen ($N_2$), and three parts helium (He), with the addition of 5% xenon (Xe) at a pressure of 50 Torr. Other embodiments use other gas mixtures, or their isotopes, including portions of neon (Ne), carbon monoxide (CO), hydrogen ($H_2$), krypton (Kr), argon (Ar) or oxygen ($O_2$) and other gases at various other gas pressures, however, it will be appreciated that a non-gaseous lasing medium could also be employed. For instance, an alternative embodiment lasing medium could comprise one or more of the following vapors: copper, gold, strontium, barium, a halide compound of copper, a halide compound of gold, a halide compound of strontium, and a halide compound of barium. Other embodiments use liquids or dyes for their lasing medium.

The slab laser 10 also includes a power supply 21 that applies excitation energy to the gas lasing medium, which causes the lasing medium to emit laser energy. The excitation energy supplied by the power supply 21 in the depicted embodiment has an associated RF voltage, but may also be associated with microwave, pulsed, continuous wave, direct current, or any other voltage that stimulates the lasing medium into producing laser energy. Alternative embodiments utilize other forms of excitation including optically pumped solid-state lasers or use energy sources based upon solar energy, nuclear energy, or chemical energy. When the RF voltage is applied to the gas lasing medium via the slab electrodes 12 and 14, a gas discharge forms within the resonator cavity 20 between the front and rear mirrors 16 and 18. The front and rear mirrors 16 and 18 form the laser energy into a laser beam 22 that travels back and forth in a longitudinal direction along a z-axis as shown in FIG. 1.

In the slab laser 10, the front and rear mirrors 16 and 18 are shaped and positioned to form an unstable resonator along the x-axis of FIG. 1 with an exit aperture 24 such that the laser beam 22 travels laterally until the laser beam exits the resonator cavity 20 via the exit aperture. The slab laser 10 has what is referred to as an unstable resonator even though its resonator is stable along the y-axis of FIG. 1 since its resonator is unstable along the x-axis. This slab laser 10 is alternatively referred to as a hybrid stable-unstable resonator since it is stable with respect to one axis and unstable with respect to another axis. The slab electrodes 12 and 14 are positioned sufficiently far from each other so that the resonator cavity 20 acts as a free-space resonator along the y-axis with a Fresnel number of approximately 0.9 in the depicted embodiment. The slab electrodes 12 and 14 are sufficiently wide and the resonator cavity 20 has little if any sidewalls so that the laser beam 22 has free space propagation with respect to the x-axis as well. Other embodiments use free-space resonators of other Fresnel numbers. Since the resonator cavity 20 acts as a free-space resonator, no special polishing of the slab electrodes 12 and 14 is required in the manufacturing process. Other embodiments include waveguide resonators and non-hybrid stable or unstable resonators.

The laser beam 22 produced by the slab laser 10 exits the resonator cavity 20 via the exit aperture 24, as shown in FIG. 1. In the depicted embodiment, the front and rear mirrors 16 and 18 have opposing concave reflective surfaces. The front and rear mirrors 16 and 18 are also confocal, i.e., have a common focal point. The exit aperture 24 is formed between the resonator walls 12 and 14 by extending the rear mirror 18 beyond an end of the front mirror 16 (along the x-axis of FIG. 1) so that the laser beam 22 is reflected by the rear mirror 18 out of the resonator cavity 20 through the exit aperture 24. The front mirror 16 and rear mirror 18 in the depicted embodiment are totally reflecting, but in other embodiments the mirrors are partially reflecting.

Figure 7:
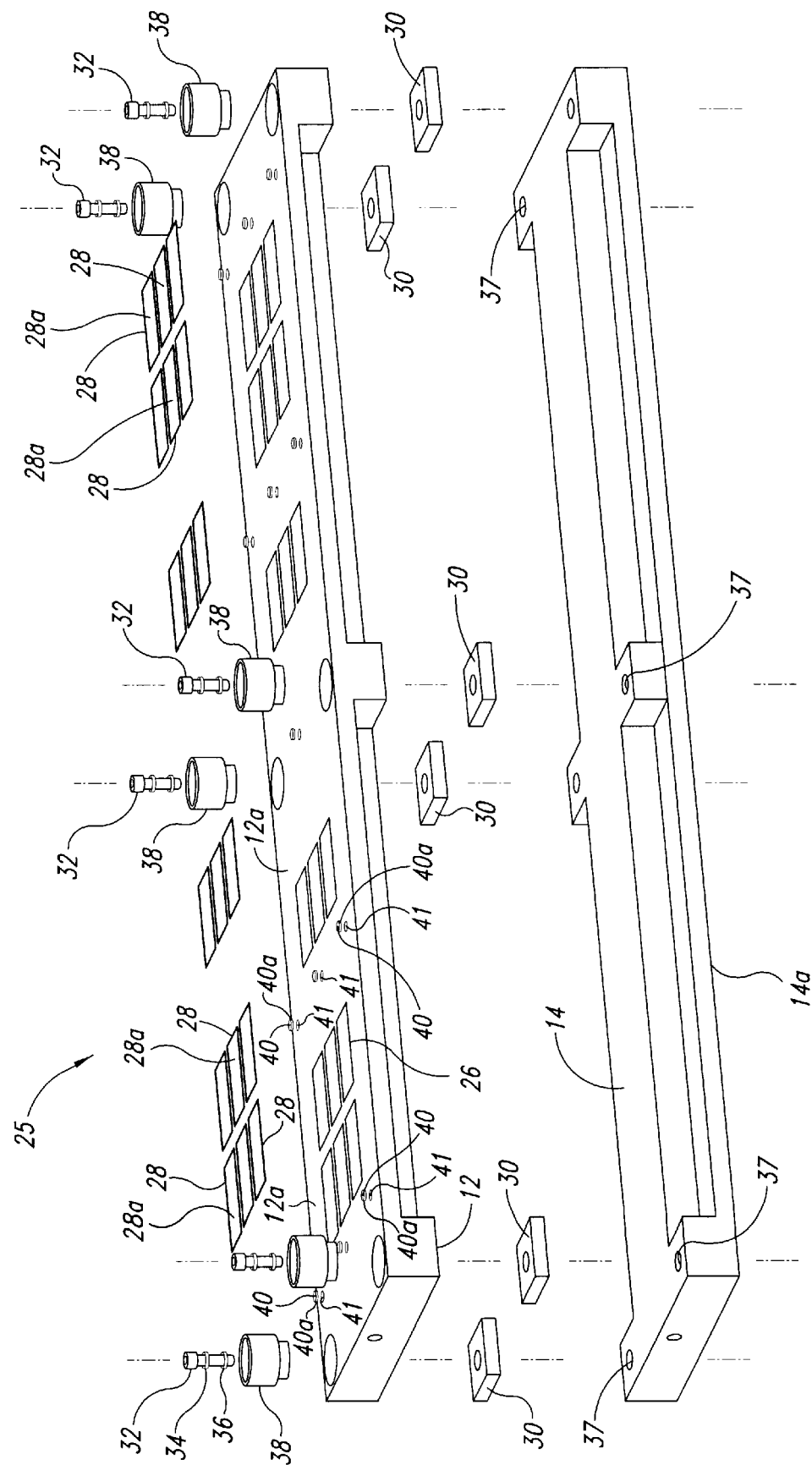
FIG. 7 is an enlarged, exploded isometric diagram illustrating the electrode assembly of the depicted embodiment of FIG. 1.
Figure 8:
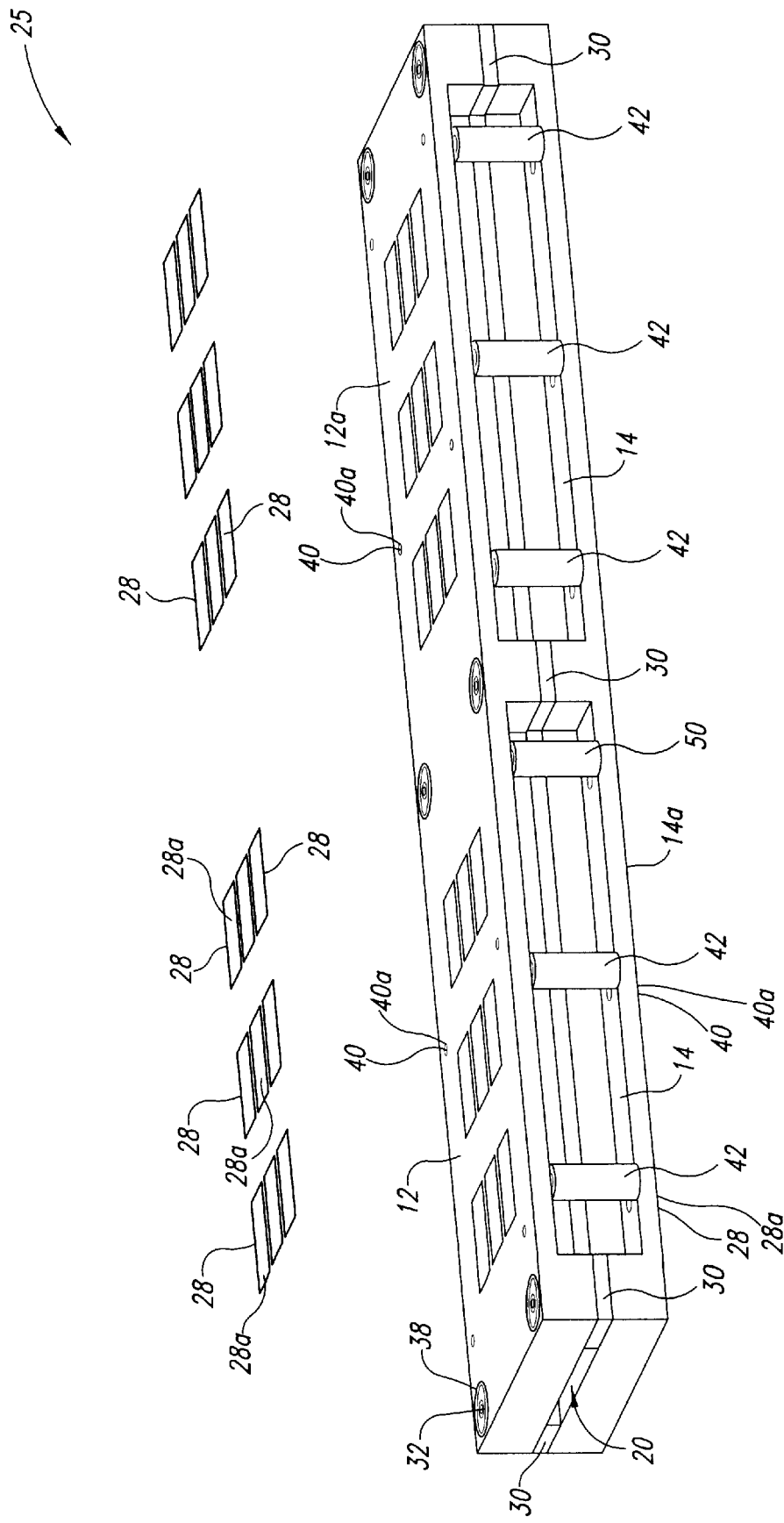
FIG. 8 is an isometric diagram illustrating the electrode assembly of FIG. 7 using inductors.

The first and second electrodes 12 and 14 are shown in a more detailed view of FIGS. 7 and 8 as part of an electrode assembly 25. The electrode assembly 25 includes depressions 26 in an exterior, outer wall surface 12a of the first electrode 12 and in an exterior outer wall surface 14a of the second electrode 14 sized and shaped to receive thermal strips 28. The depressions and thermal strips for the outer wall surface 14a of the second electrode 14 are not shown but are substantially identical to those for the first electrode 12. In other embodiments, one or more aspects of the thermal material used for the first electrode 12 differs from one or more aspects of the thermal material used for the second electrode 14 with those aspects including but not limited to size, shape, type, and number of strips or pieces used. In the depicted embodiment, the thermal strips 28 are made of 1 mm thick alumina ($Al_2O_3$) ceramic of approximately 96% purity. The thermal strips 28 electrically insulate the first and second electrodes 12 and 14 from a housing 44 within which the electrode assembly 25 is positioned on assembly of the laser 10, best shown in FIGS. 9 and 10. The thermal strips 28 thermally conduct heat to the housing 44 for cooling of the laser by having external surfaces 28a of the thermal strips 28 in contact with the housing. The housing 44 of the depicted embodiment is of vacuum type to contain the gas lasing medium and to fully enclose the discharge area of the resonator cavity 20.

The housing 44 in the depicted embodiment has a rectangular transverse cross-sectional profile; however, housings of other embodiments have other transverse cross-sectional profiles including square, annular and other profiles. Other embodiments use an unsealed housing that allows for a slow flow of purge gas to circulate into and out of the housing, but does not significantly contribute any cooling effects to the first and second electrodes 12 and 14. Still other embodiments use other types of ceramic, dielectric material, or other electrically insulating material for the thermal strips 28 which is also a thermally conductive material positioned adjacent to the outer wall surfaces 12a and 14a of the first and second electrodes 12 and 14. For instance, the following can be used either alone or in various combinations with each other: alumina, beryllia, boron nitride, aluminum nitride, mica, polyimide or other electrically insulating materials having thermally conductive and dielectric properties. For gas lasers, the thermal conducting materials are selected with a thermal conductivity greater than the thermal conductivity of the lasing gas medium used in the lasers. These thermal materials can be formed in various shapes other than flat strips positioned adjacent to the first and second electrodes 12 and 14 and adjacent to the housing 44 by either being press fitted into the depressions 26 as is done in the depicted embodiment or by other methods such as coating and bonding methods, e.g., using flame or plasma spraying or anodizing or other methods known in the art. The coating and bonding methods include coating and bonding either portions of the exterior outer wall surfaces 12a and 14a of the first and second electrodes 12 and 14, respectively, or coating and bonding portions of the interior surfaces of the housing 44 adjacent these exterior outer wall surfaces of the electrodes, or coating and bonding a combination of portions of both interior housing and exterior electrode wall surfaces.

In the depicted embodiment, the electrode assembly 25 further includes ceramic spacers 30 to provide gaps between the first and second electrodes 12 and 14. Other embodiments use other ways to support the first and second electrodes 12 and 14 to maintain gaps between the electrodes. The first and second electrodes 12 and 14 are fastened together with the ceramic spacers 30 therebetween rising bolts 32, lock washers 34, and flat washers 36. The bolts 32 are threadably received in threaded apertures 37 in the second electrode 14. The bolts and washers are positioned within ceramic bushings 38 to insulate the first electrode 12 from the second electrode 14.

The first and second electrodes 12 and 14 further include ceramic pills 40 received in rows of recesses 41 formed in the outer wall surface 12a of the first electrode 12 and formed in the outer wall surface 14a of the second electrode 14 to provide physical separation of the first and second electrodes 12 and 14 from the housing 44 with external surfaces 40a of the ceramic pills 40 being in contact with the housing. The ceramic pills 40 and recesses 41 of the second electrode are not shown in the drawings but are substantially identical to those for the first electrode 12. The first and second electrodes 12 and 14 can be fabricated from one or a combination of aluminum, copper, brass, stainless steel, gold, silver, platinum or other suitable metals or compounds. The housing 44 in the depicted embodiment is formed from a heat conductive metal alloy, but in other embodiments the housing can be made from other thermally conductive materials.

The slab laser 10 in the depicted embodiment, best illustrated in FIG. 9, includes two end caps 46 positioned at the opposing ends of the housing 44, and two optic assemblies 48 positioned at the opposing ends of the housing, outward of the corresponding end cap.

The laser 10 is assembled by placing the electrode assembly 25 inside of the housing 44 as shown in FIG. 10, by expanding the housing in the direction shown by arrows, A in FIG. 9. The housing 44 has sufficiently flexible and resilient top and bottom walls 44a and 44b to allow them to be pulled apart sufficiently from an unflexed position to a first flexed position for insertion of the electrode assembly 25 therebetween and then to allow them to move back toward a less flexed second position engaging the electrode assembly and clamping the electrode assembly within the housing. The housing 44 has extended longitudinal ridges 45 integral with the top and bottom walls 44a and 44b of the housing to allow a mechanism (not shown) to clamp on to the longitudinal ridges to apply the outward force necessary to expand the top and bottom walls of the housing. In the depicted embodiment, the top and bottom walls 44a and 44b of the housing 44 are so formed to provide substantially uniform contact, along the transverse x-axis, with the thermal strips 28 and the ceramic pills 40 when in the second flexed position.

Figure 11A:
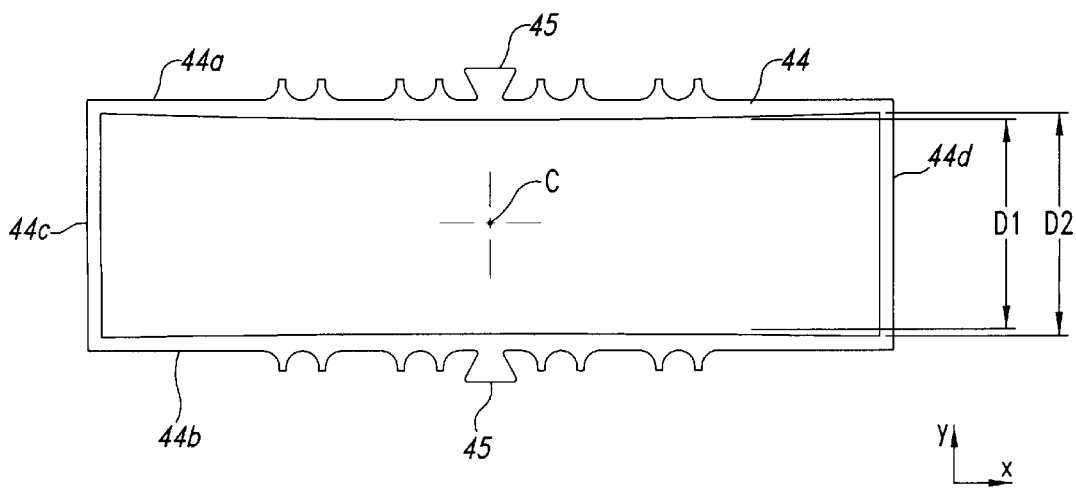
FIG. 11A is a transverse cross-sectional view showing bowing of top and bottom walls of the housing of the laser of FIG. 10.

As best shown in FIG. 11A, when in the unflexed position the top and bottom walls 44a and 44b of the housing 44 are slightly bowed inward toward the center, C, of the housing in the direction of the transverse y-axis along the transverse x-axis from both first and second sidewalls 44c and 44d of the housing 44 toward a center, indicated by letter "C", of the housing in the direction of the transverse y-axis. For the housing 44 in the unflexed position of the depicted embodiment, the distance, D1, between the top and bottom walls 44a and 44b of the housing 44 at the center, C, of the housing is 1.671, plus/minus 0.030 inches, whereas the distance, D2, that the first and second sidewalls 44c and 44d span between the top and bottom walls is 1.757 inches, plus/minus 0.016 inches.

Figure 11B:
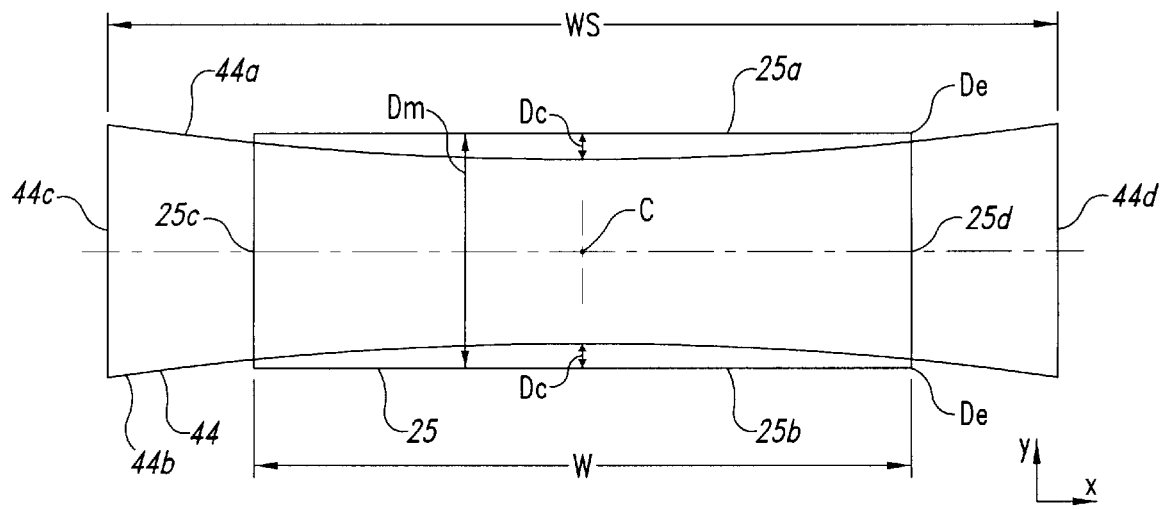
FIG. 11B is an exaggerated simplified transverse profile of the housing of FIG. 11A overlaid upon a simplified transverse profile of the electrode assembly of FIG. 8.

An exaggerated simplified transverse cross-sectional profile of the housing 44 in the unflexed position overlaid upon a simplified transverse cross-sectional profile of the electrode assembly 25 taken along a plane parallel to the x-axis and y-axis is illustrated in FIG. 11B to compare their dimensions. Top and bottom external surfaces 25a and 25b of the electrode assembly 25 are defined by the external surfaces 28a of the thermal strips 28 and/or the external surfaces 40a of the ceramic pills 40 located adjacent to the outer wall surfaces 12a and 14a of the first and second electrodes 12 and 14 as shown in FIGS. 8 and 9. Referring to FIG. 11B, the maximum distance, Dm, between the top and bottom external surfaces 25a and 25b of the electrode assembly 25 is the distance between the external surfaces 28a of pairs of the thermal strips 28 and/or the external surfaces 40a of pairs of the ceramic pills 40 located at corresponding positions on opposing sides of the outer wall surfaces 12a and 14a of the first and second electrodes 12 and 14.

In the depicted embodiment, in the unflexed position, the interior surface of the top and bottom walls 44a and 44b of the housing 44 at the center, C, of the housing are closer together by two times Dc (Dc being 0.010 to 0.050 inches in the depicted embodiment) than the maximum distance, Dm, between top and bottom external surfaces 25a and 25b of the electrode assembly 25. The interior surfaces of the top and bottom walls 44a and 44b of the housing 44 at first and second sidewalls 25c and 25d of the electrode assembly 25 are closer together by two times De (De being 0.003 to 0.040 inches in the depicted embodiment) than the maximum distance, Dm, between the top and bottom external surfaces 25a and 25b of the electrode assembly 25. In the depicted embodiment, the width, W, along the x-axis of the electrode assembly 25 is 3.7 inches and the distance between the outer wall surfaces 12a and 14a of the first and second electrodes 12 and 14 is 1.731 inches. The housing 44 is an aluminum extrusion with the top and bottom walls 44a and 44b of the housing in the depicted embodiment having an undeformed wall thickness of 0.093 inches and an undeformed wall span, WS, of 6.0 inches.

Figure 12:
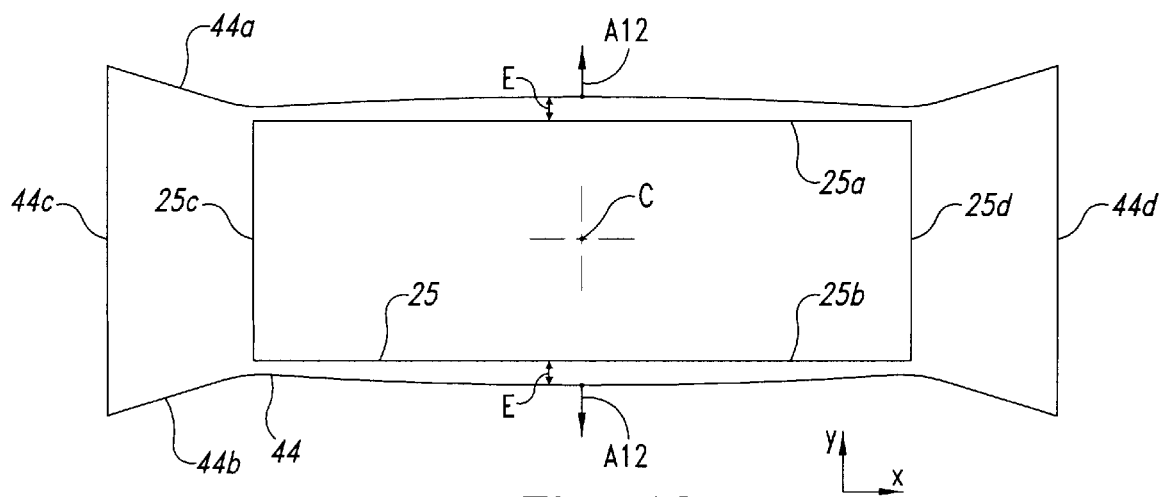
FIG. 12 is the transverse profile of the housing overlaid upon the transverse profile of the electrode assembly shown in FIG. 11B showing the housing in a fully expanded position.

To allow for insertion of the electrode assembly 25 into the housing 44, the top and bottom walls 44a and 44b of the housing are pulled farther apart in the direction of the arrow A12, from the unflexed position of FIG. 11B, another 0.14 inches in the depicted embodiment, into the first flexed position shown in FIG. 12. The first flexed position allows for a clearance, E, of at least 0.010 inches in the depicted embodiment between the top and bottom external surfaces 25a and 25b of the electrode assembly 25 and the interior surfaces of the top and bottom walls 44a and 44b of the housing 44 all along the transverse x-axis whereas other embodiments allow for a clearance, E, of at least 0.005 inches.

Once the electrode assembly 25 is fully inserted inside the housing 44, the top and bottom walls 44a and 44b of the housing are released and allowed to relax first into a third position with initial contact of the top and bottom walls of the housing being made with the top and bottom external surfaces 25a and 25b of the electrode assembly at the first and second sidewalls 25c and 25d of the electrode assembly. In this third position, at a transverse center, G, a clearance, I, exists between the top external surface 25a of the electrode assembly 25 and the interior surface of the top wall 44a of the housing, and the clearance, I, also exists between the bottom external surface 25b of the electrode assembly and the interior surface of the bottom wall 44b of the housing. The clearance, I, in the depicted embodiment is less than or equal to 0.007 inches.

Figure 13:
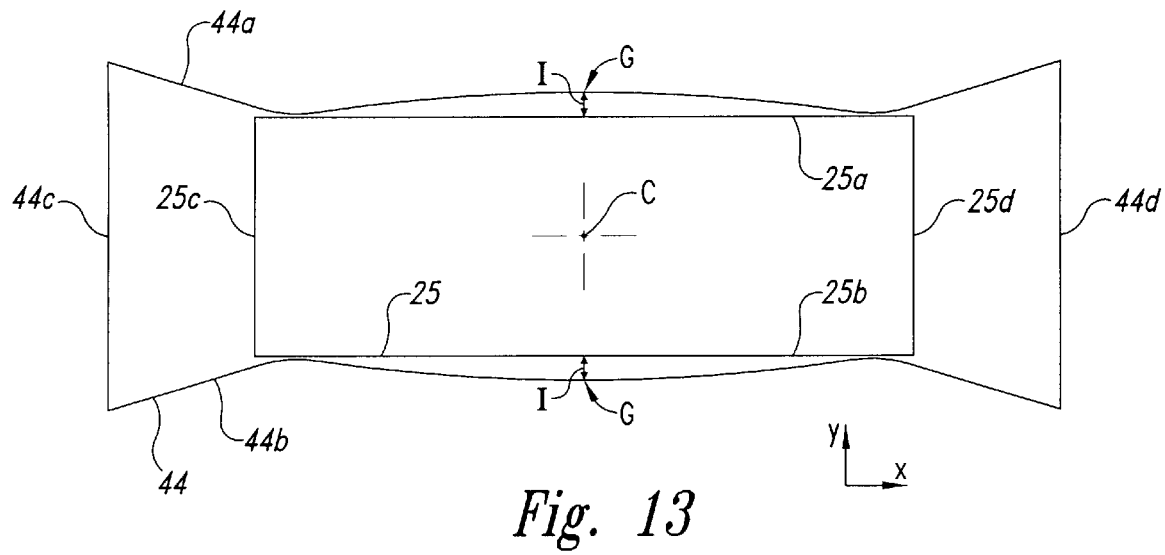
FIG. 13 is the transverse profile of the housing overlaid upon the transverse profile of the electrode assembly shown in FIG. 11B showing the housing in an initial relaxed position.
Figure 14:
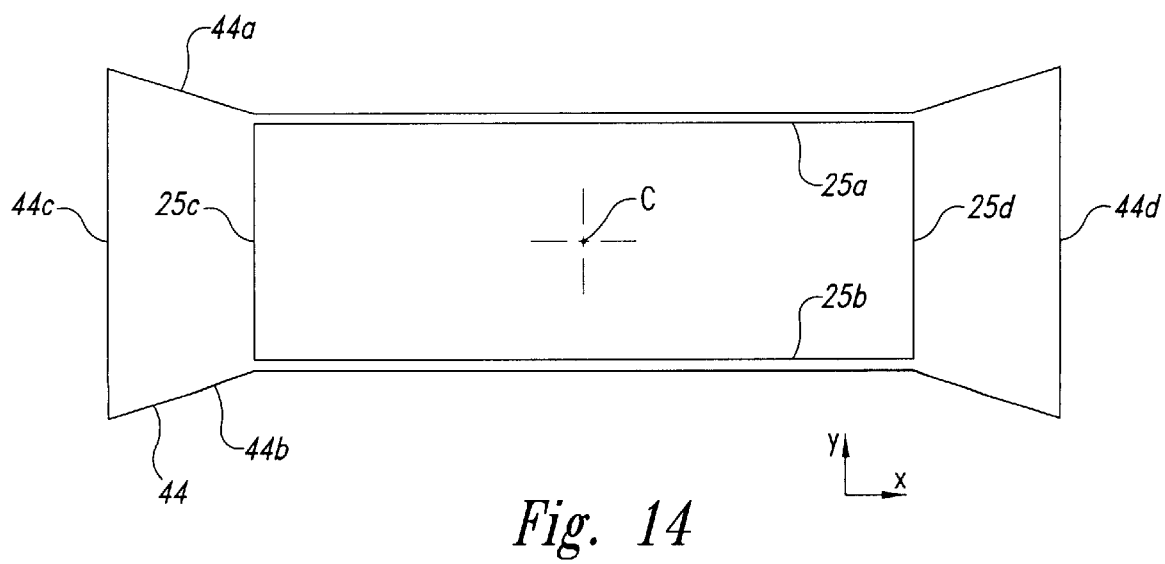
FIG. 14 is the transverse profile of the housing overlaid upon the transverse profile of the electrode assembly shown in FIG. 11B showing the housing in the final relaxed position.
Figure 15A:
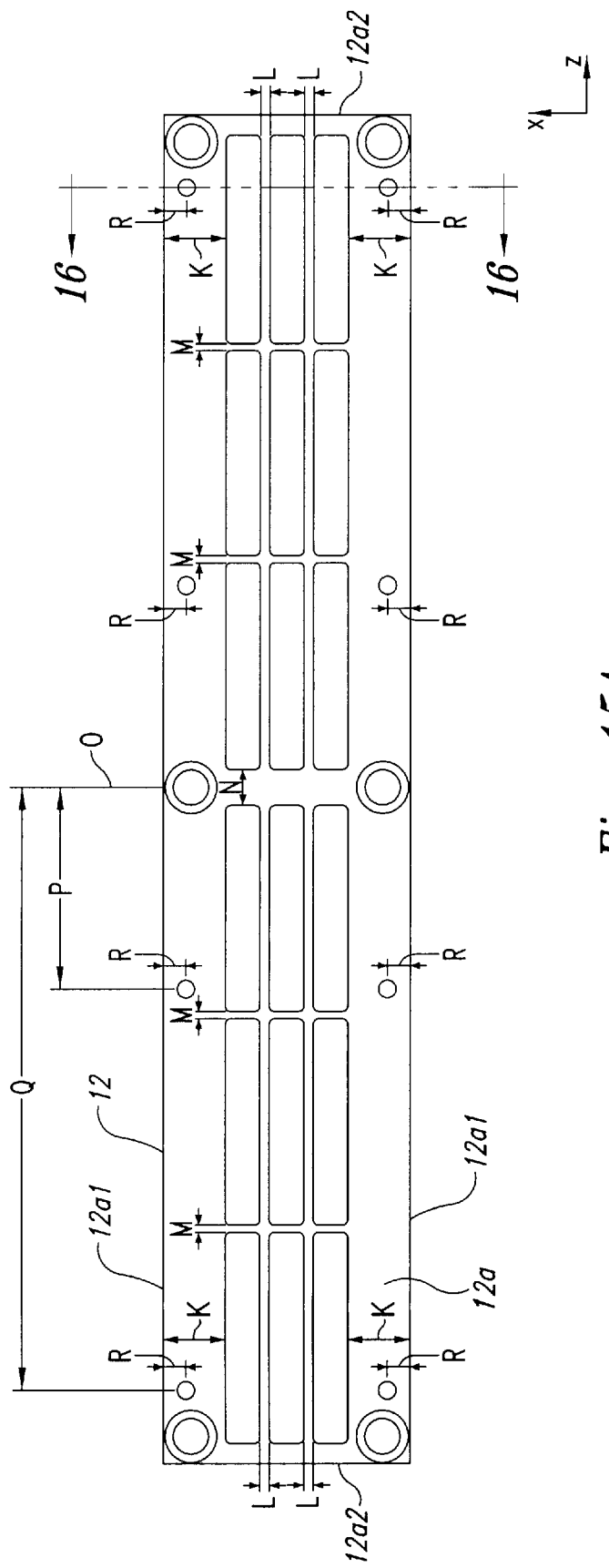
FIG. 15A is a top view of the first electrode of the electrode assembly of FIG. 8 showing thermal strip and ceramic pill placement of an alternative embodiment.
Figure 15B:
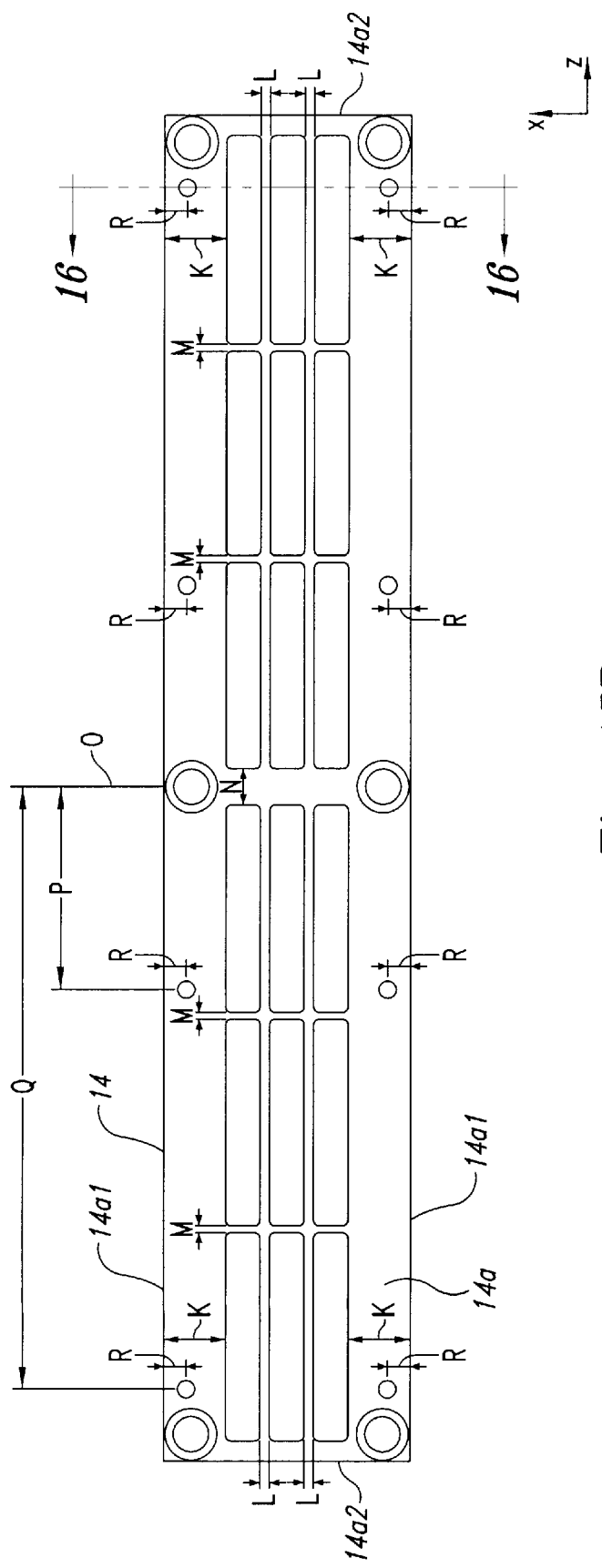
FIG. 15B is a bottom view of the second electrode of the electrode assembly of FIG. 8 showing thermal strip and ceramic pill placement of the alternative embodiment of FIG. 15A.
Figure 16:
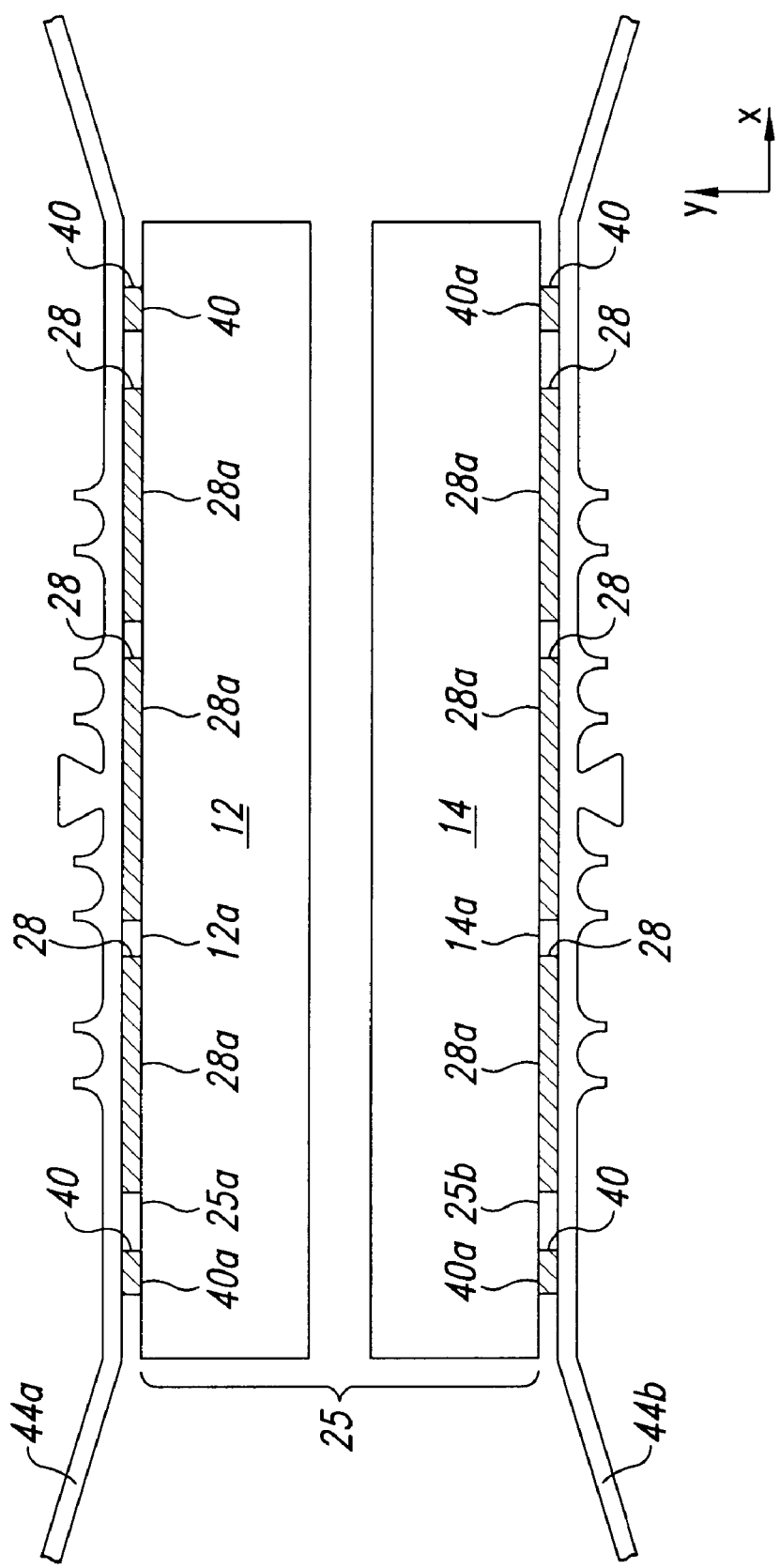
FIG. 16 is a transverse cross-sectional view of the electrode assembly of FIG. 8 taken substantially along the line 16—16 of FIGS. 15A and 15B showing flexing detail of the top and bottom walls of the housing.

If a conventional substantially rigid housing were used, the third position shown in FIG. 13 would be the final position the housing would assume when making contact with components such as electrodes. However, in the present invention, the housing 44 is sufficiently flexible to allow for continued relaxation of the housing onto the electrode assembly 25. As shown in FIG. 14, the top and bottom walls 44a and 44b of the housing 44 are flexible enough to further move inward as they relax sufficiently to make contact with the top and bottom external surfaces 25a and 25b of the electrode assembly 25 along substantially the entire width of the electrode assembly along the transverse x-axis. FIG. 16 is a more detailed cross-sectional view taken substantially along the line 16—16 of FIGS. 15A and 15B showing the extent of contact between the interior surfaces of the top and bottom walls 44a and 44b of the housing 44 with the top and bottom external surfaces 25a and 25b of the electrode assembly 25. As shown in FIG. 16, the top and bottom walls 44a and 44b of the housing 44 are flexible enough to contact the external surfaces 28a of the thermal strips 28 and the external surfaces 40a of the ceramic pills 40, but yet are inflexible enough to prevent the interior surfaces of the top and bottom walls of the housing from contacting the outer wall surfaces 12a and 14a of the first and second electrodes 12 and 14.

Once the end caps 46 and the optic assemblies 48 are attached to the housing 44, a lasing gas mixture is introduced into the housing at a pressure below atmospheric. In the depicted embodiment, the housing 44 has sufficient flexibility to flex so that the differential pressure between the gas inside the housing and the external atmosphere causes the top and bottom walls 44a and 44b to further clamp the electrode assembly 25 to assure that the internal surfaces of the housing top and bottom walls 44a and 44b are pressed into contact with the thermal strips 28 of the first and second electrodes 12 and 14 for better thermal contact of the housing with the thermal strips to better transfer heat to the housing. The dimensions of the housing 44 and the electrode assembly 25, including the thermal strips 28, are selected to insure good thermal contact between the housing and the thermal strips of the first and second electrodes 12 and 14.

Cooling of the electrode assembly 25 is partially accomplished via heat conduction through the gas mixture to the top and bottom walls 44a and 44b of the housing 44. This cooling is dramatically increased by the use of the thermal strips 28, or other suitable thermally conductive, but electrically insulating material, between each of the first and second electrodes 12 and 14 and the housing 44. Use of the thermal strips 28 removes a substantial portion of the gap between the first and second electrodes 12 and 14 and the housing 44 in which the gas resides. This gas gap has a significantly lower thermal conductivity that typically reduces cooling of the electrode assembly 25, but with the present invention is eliminated over a substantial portion of the outer wall surfaces 12a and 14a of the first and second electrodes 12 and 14. The thermal strips 28 effectively contribute to cooling of the first and second electrodes 12 and 14 so that cooling fluid need not be circulated through any type of interior chamber for the electrodes.

The number, thickness and surface size of the thermal strips 28, the type of dielectric or other material used for the thermal strips, and the location and spacing of the thermal strips are factors involved in optimizing the amount of heat conduction from the electrode assembly 25 to the housing 44 for cooling of the laser 10. In the depicted embodiment, the alumina ceramic chosen for the thermal strips 28 has a favorable mix of thermal conductivity for adequate conduction of heat away from the electrode assembly 25 and appropriate dielectric constant to control discharge breakdown of the lasing plasma. The thermal strips 28 of the present invention are to be distinguished from the prior art electrically insulating ceramic pills whose small size typically on the order of 1% of the electrode surface area is solely to electrically isolate electrodes from a housing.

The chosen alumina ceramic also has an appropriate amount of flexure strength to avoid possible breakage during placement of the electrode assembly 25 into the housing 44. In the depicted embodiment, the 1 mm thickness of the thermal strips 28 is as thin as practicable without unreasonably increasing the risk of breakage during assembly or use. As noted above, the flexibility of the housing walls 44a and 44b combined with a pressure differential existing between the gas mixture inside of the housing 44 and the atmosphere, insures that contact is established and maintained between the housing 44 and the thermal strips 28 in the depicted embodiment. Alternative embodiments use clamps or other support structures to maintain good contact between the thermal strips 28 and the housing 44.

Use of the thermal strips 28 dramatically improves long-term performance and power stability of lasers, and in particular, air cooled lasers. For instance, experiments indicate a direct correlation between the amount of ceramic used for the thermal strips 28 and improvement in steady state output power level of a laser. For the depicted embodiment, the addition of 1 mm thick alumina ceramic thermal strips 28 with a collective surface size equivalent to 30% of the surface area of the outer wall surfaces 12a and 14a of the first and second electrodes 12 and 14 shows an improvement of the steady state output power of the slab laser 10 by a factor of two or more with a decrease in the thermal resistance by nearly two orders of magnitude. A top profile of the electrode assembly 25 shown in FIGS. 15A and 15B best illustrates the layout of the thermal strips 28 and the ceramic pills 40 used in the depicted embodiment with the first electrode 12 shown in FIG. 15A and the second electrode 14 shown in FIG. 15B.

For the embodiment of the first electrode 12 depicted in FIG. 15A and the second electrode depicted in FIG. 15B, the thermal strips are 0.520 inches wide and 3.020 inches long. The depressions 26 into the outer wall surfaces 12a and 14a of the first and second electrodes 12 and 14 are 0.025 inches deep. The thermal strips are 0.040 inches thick so extend 0.015 inches past the outer wall surfaces 12a and 14a of the first and second electrodes 12 and 14.

The thermal strips 28 are positioned a distance, K, of 0.945 inches along the transverse x-axis from the longitudinal edge, 12a1 and 14a,1 of the first and second electrodes 12 and 14. The thermal strips 28 are spaced apart from each other a distance, L, of 0.125 inches along the transverse x-axis and a distance, M, of 0.105 inches along the longitudinal z-axis except for a distance, N, of 0.50 inches along the longitudinal z-axis at the longitudinal center, O, of the first and second electrodes as shown in FIGS. 15A and 15B.

The ceramic pills 40 are 0.25 inches in diameter. The centers of one set of ceramic pills 40 are spaced a distance, P, of 2.917 inches along the longitudinal z-axis from the longitudinal center, O, and the centers of another set of ceramic pills 40 are spaced a distance, Q, of 8.750 inches along the longitudinal z-axis from the longitudinal center, O. The centers of the ceramic pills 40 are spaced from the longitudinal edges 12a1 and 14a1 of the first and second electrodes a distance, R, of 0.350 inches.

Another consequence is that the equilibrium operating temperature of the first and second electrodes 12 and 14 is reduced from 95° C. to 45° C. Coverage up to 100% of the surface area of the outer wall surfaces 12a and 14a of the first and second electrodes 12 and 14 are used in alternative embodiments, however, some configurations of lasers require less than 100% surface area coverage to maximize heat transfer from the first and second electrodes 12 and 14.

In other embodiments, coverage of at least 5% of the surface area of the outer wall surfaces 12a and 14a of the first and second electrodes 12 and 14 increases the steady state stable output power of the slab laser 10 by approximately 20%, which is a minimum heat transfer effect to justify the heat transfer system. Other embodiments utilize a surface area coverage of 15% or more resulting in over a 50% gain in steady state stable output power, which is a more commercially desirable result.

Using alumina ceramic in the depicted embodiment for the thermal strips 28 also increases electrical capacitance between the electrode assembly 25 and the housing 44. This increase in capacitance in turn reduces the unlit gas to lit gas discharge frequency shift, which makes the discharge of the lasing medium easier to initiate. The additional capacitance increases the quality factor ratio of electrical energy that can be stored versus that amount of electrical energy that is dissipated with respect to the physics involved with the electrode assembly 25. This increase in the quality factor ratio in turn results in a larger voltage across the first and second electrodes 12 and 14, and consequently, easier ignition of the discharge.

Modeling of the discharge physics involved with the depicted embodiment indicates that the 30% coverage of the outer wall surfaces 12a and 14a of the first and second electrodes 12 and 14 with the 1 mm thick alumina ceramic increases the capacitance between the electrode assembly 25 and the housing 44 by 68% with a corresponding reduction in unlit to lit resonance frequency shift by 38%, which makes the plasma discharge significantly easier to initiate. Similar modeling indicates that a 100% coverage of the outer wall surfaces 12a and 14a of the first and second electrodes 12 and 14 with 1 mm thick alumina ceramic increases the capacitance between the electrode assembly 25 and the housing 44 by 227% with a reduction in frequency shift of 66%.

From the advantages gained by 100% coverage, one may conclude that this would be an ideal solution for cooling. There are, however, diminishing returns in adding more thermal strips 28 beyond the point at which the thermal conductivity is sufficient to accomplish adequate removal of heat from the first and second electrodes 12 and 14, and consequently, adequate removal of heat from the plasma to provide acceptable laser performance. There is a point at which the amount of capacitance between the electrode assembly 25 and the housing 44 becomes too much and starts to significantly distort the electric field and voltage distribution between the first and second electrodes 12 and 14 over the entire length of the electrodes. It is generally agreed that optimum laser performance is achieved if the longitudinal voltage non-uniformity between the first and second electrodes 12 and 14 is less than about 5 to 10%. Transmission line modeling suggests that the inclusion of up to 30% alumina ceramic, as found in the depicted embodiment, will still satisfy this voltage uniformity criterion. For the depicted embodiment, 30% coverage of alumina ceramic provides sufficient cooling to maintain the desired performance of the slab laser 10.

For the depicted embodiment, the plasma discharge is electrically excited by a radio frequency generator of the power supply 21 applied via a matching network directly to the first and second electrodes 12 and 14. The RF frequency generator of the power supply 21 operates at a frequency of 40.68 MHz with an output power level of at least 1 kW, but other embodiments operate at other frequencies and power levels. The generator of the power supply 21 is connected to the first and second electrodes 12 and 14 in a biphase fashion such that the phase of the voltage on one electrode is shifted substantially 180 degrees relative to the voltage on the other electrode to achieve a biphase excitation. This phase shift is accomplished by placement of inductors 42 between the first and second electrodes 12 and 14 as shown in FIG. 8.

Other embodiments use higher coverage by the thermal strips 28 and use of thermal material in other shapes with higher coverage of the first and second electrodes than the 30% coverage by the alumina ceramic thermal strips of the depicted embodiment. For these embodiments using higher coverage levels, inductors 52 are placed between each of the first and second electrodes 12 and 14 and the housing 44 as illustrated in FIG. 10. Coverage values as high as 100% of the outer wall surfaces 12a and 14a of the first and second electrodes 12 and 14 are used in alternative embodiments; however, sufficient inductance values are used for the inductors 52 to balance the capacitance introduced by the use of the additional thermal material to maintain uniformity of the voltage and electric field between the first and second electrodes 12 and 14.

As shown in FIG. 10, the housing 44 can be formed with grooves 50 on the outward side of its top and bottom walls 44a and 44b of the housing to receive cooling tubes (not shown), to accommodate operation of the slab laser 10 at high power levels. The housing 44 can also have cooling fins or other forms of heat sinks to assist in removing heat from the housing and other appendages including mounting brackets.

From the foregoing it will be appreciated that, although specific embodiments of the invention have been described herein for the purposes of illustration, various modifications may be made without deviating from the spirit and scope of the invention. Accordingly, the invention is not limited except as by the appended claims.

It is claimed:

1. A laser comprising:

first and second electrodes each having an interior surface and an exterior surface;

a lasing medium located between the interior surfaces of the first and second electrodes;

a housing cavity having opposing first and second interior surfaces and sized to contain the first and second electrodes, the first and second electrodes being positioned inside the housing cavity with the interior surfaces of the first and second electrodes opposingly spaced apart, and first and second portions of thermally conductive and electrically insulating material being other than the lasing medium, the first portion of thermally conductive material being positioned in contact with at least a portion of the first interior surface of the housing cavity and at least 5% of the exterior surface of the first electrode, the second portion of the thermally conductive material being positioned in contact with at least a portion of the second interior housing surface and at least 5% of the exterior surface of the second electrode, whereby during operation of the laser, heat is conducted from the lasing medium through the first and second electrodes and the first and second portions of the thermally conductive material to the first and second interior surfaces of the housing cavity to assist in maintaining an acceptable operating temperature of the lasing medium.

2. The laser of claim 1 wherein the thermally conductive material comprises a ceramic.

3. The laser of claim 1 wherein the first and second interior surfaces of the housing cavity comprise a metal alloy.

4. The laser of claim 1, further comprising one or more inductors electrically coupled between the electrodes and the interior surfaces of the housing cavity to compensate for capacitance of the first and second portions of the thermally conductive material.

5. The laser of claim 1 wherein the first and second portions of the thermally conductive material comprise a plurality of ceramic strips and the exterior surfaces of the first and second electrodes have a plurality of depressions, each depression being sized to receive one of the ceramic strips therein.

6. The laser of claim 1 wherein at least 15% of the exterior surface of the first electrode is covered by the first portion of the thermally conductive material and at least 15% of the exterior surface of the second electrode is covered by the second portion of the thermally conductive material.

7. The laser of claim 1 wherein the first portion of thermally conductive material contacts at least 30% of the exterior surface of the first electrode.

8. The laser of claim 1 wherein the first and second portions of thermally conductive material contact at least 50% of the exterior surface of the first and second electrode, respectively.

9. The laser of claim 1 wherein the first and second portions of thermally conductive material are directly bonded to at least part of the first and second interior surfaces, respectively, of the housing cavity.

10. The laser of claim 1 wherein the first and second portions of the thermally conductive material is less than an amount that would produce a 10% non-uniformity in voltage between the first and second electrodes.

11. The laser of claim 1 wherein the first and second electrodes are configured without internal chambers for cooling fluid.

12. The laser of claim 1 wherein the first and second portions of thermally conductive material is configured to reduce the unlit gas to lit gas discharge frequency shift of the lasing medium to make discharge of the lasing medium easier to initiate.

13. A laser utilizing a lasing medium comprising:
a housing having opposing first and second interior surfaces forming at least a portion of an interior housing space;
an electrode assembly having first and second electrodes, the first and second electrodes each having an exterior surface and an interior surface, the first and second electrodes being positioned with the interior surfaces thereof spaced apart from one another, the electrode assembly being positioned in the interior housing space; and
first and second portions of thermally conductive and electrically insulating material each having a thermal conductivity greater than the lasing medium, the first and second portions of thermally conductive material being in contact with a portion of the exterior surface of the first and second electrodes, respectively, to increase maximum stable power output of the laser by at least 20%.

14. The laser of claim 13 wherein the first and second portions of thermally conductive material comprises at least one of: alumina, beryllia, boron nitride, aluminum nitride, mica, and polyimide.

15. The laser of claim 13 wherein the first and second portions of thermally conductive material are directly bonded to a portion of the exterior surface of the first and second electrodes, respectively, by one of the following: flame, anodizing, and plasma spraying.

16. The laser of claim 13 wherein the housing includes external surfaces, portions of the external surfaces being shaped to form cooling fin structures adjacent tubes with fluid.

17. A method for constructing a laser, the method comprising:
providing a first electrode having an interior surface and an exterior surface;
providing a second electrode having an interior surface and an exterior surface;
providing first and second portions of a thermally conductive material;
providing a housing having opposing first and second interior surfaces, the interior surfaces of the housing partially defining a housing space;
placing the first and second electrodes and the first and second portions of the thermally conductive material into the housing space with the first portion of the thermally conductive material adjoining a selected portion of at least 5% of the exterior surface of the first electrode and adjoining a portion of the first interior surface of the housing, and with the second portion of the thermally conductive material adjoining a selected portion of at least 5% of the exterior surface of the second electrode and adjoining a portion of the second interior surface of the housing to achieve a selected laser power output; and
placing a lasing medium having a thermal conductivity other than that of the thermally conductive material in a portion of the housing space between the interior surface of the first electrode and the interior surface of the second electrode, whereby during operation of the laser, heat is conducted from the lasing medium through the first and second electrodes and the first and second portions of the thermally conductive material to the first and second interior surfaces of the housing to assist in maintaining an acceptable temperature of the lasing medium.

18. The method of claim 17 wherein the first and second portions of the thermally conductive material are provided from a ceramic material.

19. The method of claim 17, further comprising directly bonding the first and second portions of the thermally conductive material to the first and second interior surfaces, respectively, of the housing.

20. The method of claim 17, further comprising placing one or more first inductors electrically coupled between the first electrode and the housing having an inductance value to compensate for the capacitance between the first electrode and the housing resulting from the first portion of the thermally conductive material.

21. The method of claim 17, further comprising providing the first portion of the thermally conductive material as a first plurality of strips, forming the exterior surface of the first electrode with a first plurality of depressions, each depression of the first plurality of depressions being sized to receive at least one of the first plurality of strips therein.

22. The method of claim 17, further comprising placing the first portion of thermally conductive material to abutably contact at least 15% of the exterior surface of the first electrode.

23. The method of claim 17, further comprising placing the first portion of thermally conductive material to abutably contact at least 30% of the exterior surface of the first electrode.

24. A method for constructing a laser, the method comprising:
providing a first electrode having an interior surface and an exterior surface;
providing a second electrode having an interior surface and an exterior surface;
providing a first portion of a thermally conductive material;
providing a housing having opposing first and second interior surfaces, the interior surfaces of the housing at least partially defining a housing space;
placing the first and second electrodes and the first portion of the thermally conductive material into the housing space with the first portion of the thermally conductive material adjoining at least a portion of the exterior surface of the first electrode and adjoining at least a portion of the first interior surface of the housing to increase maximum stable power output of the laser by at least 20%; and
placing a lasing medium having a thermal conductivity other than that of the thermally conductive material in a portion of the housing space, the lasing medium being between portions of the interior surfaces of the first and second electrodes.

25. The method of claim 24, further comprising directly bonding the first portion of thermally conductive material to at least part of the exterior surface of the first electrode.

* * * * *

UNITED STATES PATENT AND TRADEMARK OFFICE
CERTIFICATE OF CORRECTION

PATENT NO.     : 6,198,758 B1
DATED          : March 6, 2001
INVENTOR(S)    : Jeffery A. Broderick et al.

Page 1 of 1

It is certified that error appears in the above-identified patent and that said Letters Patent is hereby corrected as shown below:

Claim 12, column 13,
Line 14, "casier to initiate." should read -- easier to initiate. --.

Signed and Sealed this

Twenty-fifth Day of September, 2001

*Attest:*

*Attesting Officer*

NICHOLAS P. GODICI
*Acting Director of the United States Patent and Trademark Office*